E. R. HEWITT.
DOUBLE HEADING AIR BRAKE SYSTEM.
APPLICATION FILED JULY 17, 1919.
1,345,181.
Patented June 29, 1920.
2 SHEETS—SHEET 2.
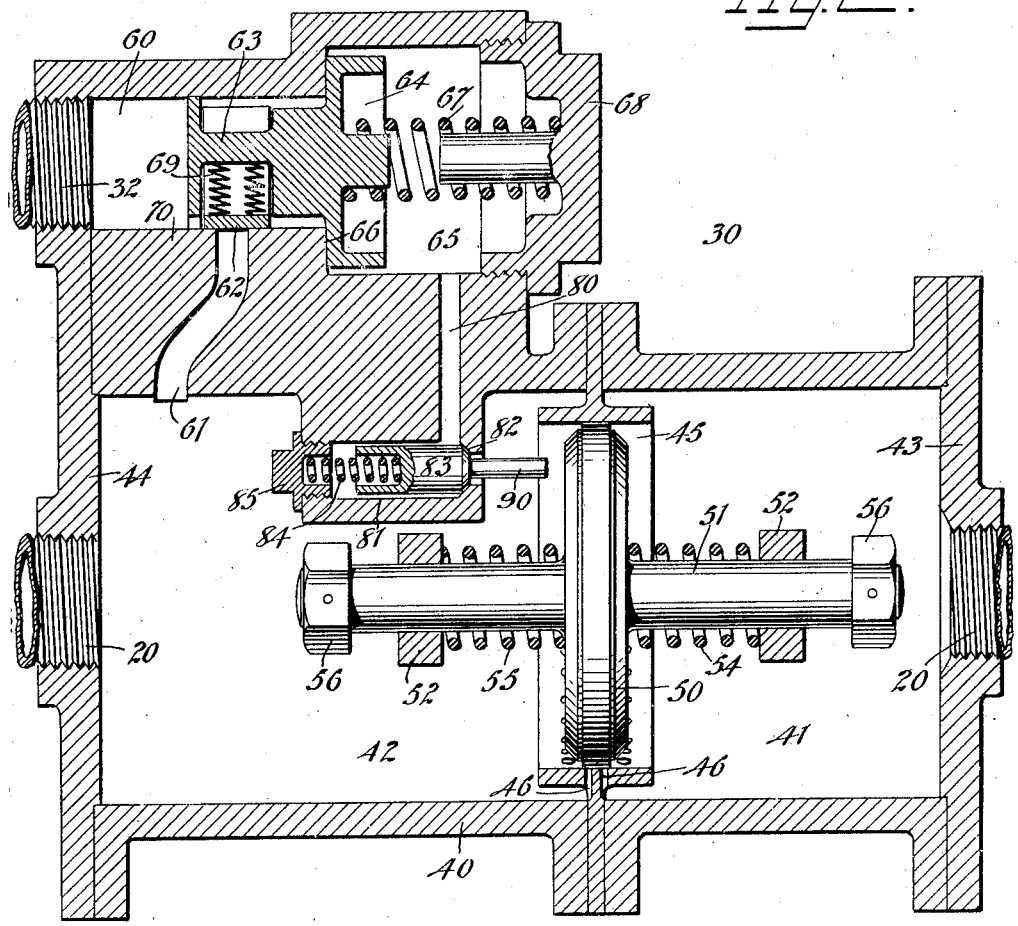
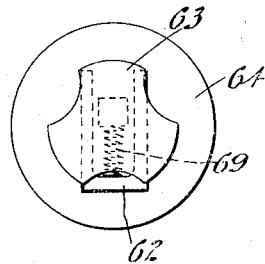
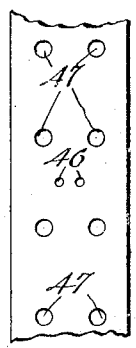
WITNESSES
INVENTOR
Edgar R. Hewitt
BY
ATTORNEYS

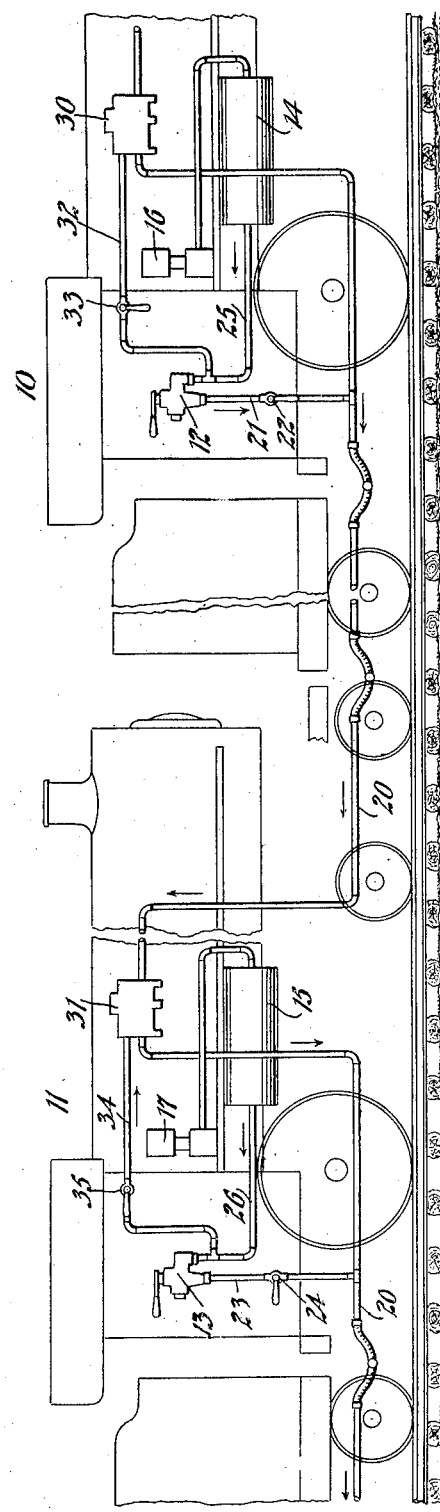

UNITED STATES PATENT OFFICE.

EDGAR R. HEWITT, OF PLATTSBURG, NEW YORK.

DOUBLE-HEADING AIR-BRAKE SYSTEM.

1,345,181.  Specification of Letters Patent.  Patented June 29, 1920.

Application filed July 17, 1919. Serial No. 311,566.

*To all whom it may concern:*

Be it known that I, EDGAR R. HEWITT, a citizen of the United States, and a resident of Plattsburg, in the county of Clinton and State of New York, have invented a new and Improved Double-Heading Air-Brake System, of which the following is a full, clear, and exact description.

The invention relates to trains headed by two or more locomotives, and its object is to provide a new and improved double heading air brake system arranged to place the engineer of the first locomotive completely in control of all available air pressure of the several locomotives. Another object is to utilize the air pressure of the main reservoir of the second locomotive to automatically assist the train pipe air pressure from the first locomotive in recharging the auxiliary reservoir of the train. Another object is to permit of using any one of the locomotives equipped with the improvements as the first or head locomotive.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the improved double heading air brake system as applied to the locomotive at the head of a train;

Fig. 2 is an enlarged sectional side elevation of one of the tapping devices;

Fig. 3 is an end view of the piston valve in the valve chamber; and

Fig. 4 is a face view of the seat for the piston in the train pipe chamber of the tapping device.

In trains headed by two or more locomotives, it is customary to use the air pressure from the first locomotive only for braking purposes, while the air pressure from the second and third locomotives is completely cut out thus enabling the engineer of the first or head locomotive to control the brakes without interference by the engineers of the second and third locomotives. In very long trains, the air supply from the main reservoir of the first locomotive is not sufficient to quickly and fully recharge the auxiliary reservoir of the train and hence considerable time is lost in recharging, and frequently an insufficient recharging is had and this insufficiency is liable to prove exceedingly dangerous in an emergency especially when going down a steep or a long grade, or both a steep and a long grade. In order to avoid this loss of time and insufficient recharging of the auxiliary reservoir, each locomotive is equipped with a tapping device which permits the engineer in charge of the first or head locomotive to utilize the air pressure of the main reservoirs of the several locomotives to recharge the auxiliary reservoirs of the train and without the engineers of the other locomotives being aware of it or requiring their services for the purpose.

As illustrated in Fig. 1, the double heading air brake system is shown applied to the first two locomotives 10 and 11 of a train, the locomotive 10 being the first or head locomotive and the locomotive 11 being the second one. The locomotives 10 and 11 are equipped with the usual engineer's valves 12 and 13 and the main reservoirs 14 and 15 charged with air pressure from the pumps 16 and 17. The train pipe 20 is connected by a pipe 21 having a valve 22 with the engineer's valve 12 of the first locomotive 10, and a similar pipe 23 having a valve 24 connects the train pipe with the engineer's valve 13 of the second locomotive 11. Pipes 25 and 26 connect the main reservoirs 14 and 15 with the corresponding engineer's valves 12 and 13. The locomotives 10 and 11 are equipped with tapping devices 30 and 31 alike in construction and interposed in the train pipe 20. The tapping device 30 is connected by a pipe 32 having a valve 33 with the pipe 25 leading from the main reservoir 14 to the engineer's valve 12, and a similar pipe 34 provided with a valve 35 connects the tapping devices 31 with the pipe 26 leading from the main reservoir 15 to the engineer's valve 13 of the second locomotive 11.

In making up a train, the valve 22 is opened while the valve 33 on the first locomotive 10 is closed, thus rendering the tapping device 30 inoperative for the time being, while the engineer's valve 12 is in operative position for controlling the air brake system. The valve 24 of the second locomotive 11 is closed while the valve 35 is opened thus shutting out or rendering inactive the engineer's valve 13 of the second locomotive 11 while the tapping device 31 is rendered active.

The tapping devices 30 and 31 are alike in construction and hence it suffices to describe but one in detail. The casing 40 of each tapping device 30 and 31 is provided with a train pipe pressure chamber having two compartments 41 and 42 closed by the heads 43 and 44 connected with the corresponding ends of the train pipe 20. The chambers 41 and 42 are separated from each other by a valve seat 45 provided with two sets of ports 46 and 47 controlled by a piston 50 having its piston rod 51 mounted to slide in suitable bearings 52 arranged in the chambers 41 and 42. Springs 54 and 55 engage opposite faces of the piston 50 abutting against bearings 52 to normally hold the piston 50 in central position on the valve seat 45, that is, with the piston covering the set of ports 46 thus disconnecting the chambers 41 and 42 from each other. The ports 46 are small and spaced close together, while the ports 47 are comparatively large and spaced farther apart. The sliding movement of the piston 50 on the valve seat 45 is limited by nuts or collars 56 attached to the ends of the piston rod 51 and adapted to abut against the corresponding bearings 52.

In the casing 40 is arranged a valve chamber 60 connected with the corresponding pipe 32 or 34 and connected by a port 61 with the compartment 42. This port 61 is controlled by a valve 62 mounted on the stem 63 of a piston 64 arranged in an enlarged extension 65 of the valve chamber 60. The piston 64 is normally seated on a shoulder 66 formed between the chamber 60 and its extension 65, and the piston 64 is pressed against the shoulder 66 by a suitable spring 67 bearing at one end on the piston and abutting at its other end against the cap 68 closing the outer end of the chamber extension 65. Springs 69 serve to hold the slide valve 62 in engagement with the valve seat 70 forming the bottom of the valve chamber 60 to prevent leakage of air pressure from the chamber 60 to the port 61 or vice versa.

From the chamber extension 65 leads a port 80 to a valve chamber 81 having a valve seat 82 leading into the compartment 42. The valve seat 82 is normally closed by a valve 83 slidable in the valve chamber 81 and pressed on by a spring 84 seated in a cap 85 closing the valve chamber 81. The valve 83 is provided with an extension rod or stem 90 passing through the valve seat 82 into the path of the piston 50 so that when the latter is moved from the right to the left it engages the pin 90 and moves the valve 83 into open position relative to the valve seat 82. When this takes place a reduction of air pressure in the chamber extension 65 takes place to allow air pressure from the main reservoir, passing by way of the pipe 32 or 34 into the chamber 60, to push the piston 64 from the left to the right, thereby moving the valve 62 clear of the port 61 with a view to permit air pressure from the main reservoir 15 of the second locomotive to pass into the compartment 42 and to the train pipe 20, in addition to the air pressure from the reservoir 14 of the first locomotive 10.

The operation is as follows:

When the several parts are in the position shown in Figs. 1 and 2, and the engineer in charge of the first locomotive desires to recharge the auxiliary reservoirs, then he moves the engineer's valve 12 into charging position. Air pressure from the main reservoir 14 now passes by way of the engineer's valve 12 and pipe 21 into the train pipe 20 and from the latter into the compartment 41 of the tapping device 31 of the second locomotive 11. The air pressure now forces piston 50 from the right to the left thereby uncovering the ports 46 and thereby establishing communication between the compartments 41 and 42. The train pipe air pressure now passes from the compartment 41 into the compartment 42 and to the train pipe 20 of the train to recharge the auxiliary reservoirs. When the piston 50 moves from the right to the left then it engages the pin 90 and unseats the valve 83. When this takes place, the air pressure in the chamber extension 65 is reduced by the air flowing through the port 80, the valve chamber 81 and the open valve seat 82, into the compartment 42 and to the train pipe. The reduction of pressure in this chamber extension 65 causes the piston 64 to move from the left to the right owing to the air pressure from the auxiliary reservoir 15 passing into the valve chamber 60 by way of the pipes 26 and 34. This air pressure exceeds that of the reduced pressure in the chamber extension 65 and consequently the piston 64 moves from the left to the right whereby the valve 62 uncovers the port 61 and the air pressure from the main reservoir 15 can now pass by way of the chamber 60 and port 61 into the compartment 42 and to the train pipe to assist in quickly and amply recharging the auxiliary reservoir.

As soon as the pressure is equalized in the auxiliary reservoirs, the train pipe and the main reservoirs 14 and 15, then the piston 50 returns to its normal central position thus again closing the ports 46 and disengaging the pin 90 to allow the valve 83 to close. The pressure of the spring 67 now returns the piston 64 to its normal position shown in Fig. 2, whereby the valve 62 again closes the port 61.

When applying the brakes, the pressure in the train pipe and consequently in the compartment 42 is greater than in the compartment 41 and hence the piston 50 moves from the left to the right beyond the ports 46 to uncover the corresponding ports 47 thus allowing a free flow of air from the train pipe to the engineer's valve 12. When the engineer's valve 12 is placed "on lap" then the spring 54 returns the piston 50 to the normal position shown in Fig. 2.

From the foregoing it will be seen that by the arrangement described, the engineer of the first locomotive 10 completely controls all the available air pressure of both locomotives 10 and 11, and if three locomotives are used all the available air pressure thereof is also at the disposal automatically of the first locomotive. As each of the locomotives is equipped with a tapping device, it is evident that any one of the locomotives can be used as the first or head locomotive.

Having thus described my invention, I claim as new and desire to secure by Letters Patent:—

1. In a double heading brake system, the combination of a main reservoir on each locomotive, a train pipe and a tapping device interposed in the said train pipe and provided with means for controlling the passage of train pipe air pressure from the main reservoir of the first locomotive through the tapping device, the said tapping device having means connecting the main reservoir of the second locomotive with the train pipe by way of the tapping device, the said second means being controlled by the said first means.

2. In a double heading brake system, the combination of a main reservoir on each locomotive, a train pipe common to both locomotives, an engineer's valve on each locomotive a tapping device on each locomotive and interposed in the train pipe, valved pipes connecting each tapping device with the corresponding main reservoir, each tapping device having a train pipe chamber provided with a piston to control the flow of the train pipe air pressure through the train pipe chamber, and means in each tapping device controlled by the said piston and controlling the flow of air pressure from the corresponding main reservoir into the main chamber and to the train pipe.

3. In a double heading air brake system, an automatic tapping device comprising a train pipe chamber interposed in the train pipe, a piston in the said train pipe chamber controlling the flow of train pipe air pressure through the train pipe chamber, a valve chamber connected with the main reservoir, ports connecting the said valve chamber with the said train pipe chamber in the rear of the said piston, a piston valve controlling one of the ports, and a valve controlling the other port and controlled by the said piston to allow air pressure from the main reservoir to actuate the said piston valve for the latter to open the piston valve port connecting the main reservoir with the train pipe chamber.

4. In a double heading brake system a tapping device, comprising a train pipe chamber interposed in the train pipe and provided with a piston controlling the flow of train pipe pressure through the said train pipe chamber, a valve chamber connected with the main reservoir and provided with a piston valve, ports connecting the valve chamber with the said train pipe chamber, one of the ports being controlled by the valve of the said piston valve, and a controlling valve in the other port and controlled by the said piston to reduce the pressure in the valve chamber on one side of the piston of the said piston valve to actuate the latter by main reservoir pressure to connect the main reservoir with the said train pipe chamber.

5. In a double heading brake system a tapping device, comprising a casing having a train pipe pressure chamber formed of two compartments separated by a valve seat having ports, a piston mounted in the valve seat and controlling the ports thereof, a valve chamber adapted to be connected with the main reservoir, a port leading into one of the compartments of the pressure chamber, a spring actuated piston valve in the valve chamber and controlling the said port, a second valve chamber communicating with the first valve chamber and having a port opening into one compartment of the pressure chamber, and a valve in the second valve chamber and having a stem extending in the path of the piston.

6. In a double heading brake system, a tapping device comprising a casing having a pressure chamber, a valve seat dividing the pressure chamber into two compartments and provided with ports, a piston having piston rods projecting from its opposite faces and mounted in the compartments of the pressure chamber to slide, springs on the piston rods, a valve chamber adapted to be connected with the main reservoir and provided with a port leading into one of the said compartments, a spring actuated piston valve in said chamber and controlling the port, a second valve chamber communicating with the first valve chamber and having a port leading into one of the said compartments, and a spring actuated valve in the second valve chamber and having a stem projecting through the port of the chamber into the path of the piston.

EDGAR R. HEWITT.